United States Patent
Chakra et al.

(10) Patent No.: US 11,029,653 B2
(45) Date of Patent: Jun. 8, 2021

(54) DYNAMIC AND GEO-FENCED MANIPULATION OF INSECTS WITH DEVICE SCREENS

(71) Applicant: International Business Machines Corporation, Armonk, NY (US)

(72) Inventors: Al Chakra, Apex, NC (US); Kelley Anders, East New Market, MD (US); Liam S. Harpur, Dublin (IE); Robert H. Grant, Atlanta, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 245 days.

(21) Appl. No.: 16/161,271

(22) Filed: Oct. 16, 2018

(65) Prior Publication Data

US 2020/0117150 A1 Apr. 16, 2020

(51) Int. Cl.

| G05B 15/02 | (2006.01) |
|---|---|
| A01M 1/02 | (2006.01) |
| G06K 9/46 | (2006.01) |
| A01M 1/10 | (2006.01) |

(52) U.S. Cl.
CPC .......... *G05B 15/02* (2013.01); *A01M 1/026* (2013.01); *A01M 1/10* (2013.01); *G06K 9/4642* (2013.01)

(58) Field of Classification Search
USPC ...................................................... 116/22 A
See application file for complete search history.

(56) References Cited

U.S. PATENT DOCUMENTS

| 5,450,063 A * | 9/1995 | Peterson | A01M 29/16 119/713 |
|---|---|---|---|
| 5,460,123 A * | 10/1995 | Kolz | A01K 79/02 119/220 |
| 8,755,571 B2 * | 6/2014 | Tsai | G06K 9/00 382/110 |
| 9,807,346 B2 | 10/2017 | Afanasyev et al. | |

(Continued)

FOREIGN PATENT DOCUMENTS

| JP | 2003180220 A | 7/2003 |
|---|---|---|
| KR | 20160144626 A | 12/2016 |
| WO | 2016168347 A1 | 10/2016 |

OTHER PUBLICATIONS

Jessica Dolcourt, "iPhone X's Face ID has at least 3 cool hidden features", Sep. 22, 2017, cnet.com, https://www.cnet.com/news/iphone-x-face-id-cool-hidden-features/ (Year: 2017).*

(Continued)

*Primary Examiner* — Darren W Ark
*Assistant Examiner* — William L Gmoser
(74) *Attorney, Agent, or Firm* — Cantor Colburn LLP; Teddi Maranzano

(57) ABSTRACT

A mobile device, computer program product for a mobile device and a computer-implemented method of operating a mobile device is disclosed. The mobile device includes a sensor, an animal database and a processor. The sensor receives data regarding an animal proximate the mobile device. The processor compares the data to the animal database to determine a type of animal at the mobile device, and performs an action on the mobile device based on the type of animal in order to manipulate a behavior of the animal.

14 Claims, 3 Drawing Sheets

(56) References Cited

U.S. PATENT DOCUMENTS

| | | | |
|---|---|---|---|
| 2006/0215885 A1* | 9/2006 | Kates | A01M 1/026 |
| | | | 382/120 |
| 2010/0043083 A1 | 2/2010 | Vosshall et al. | |
| 2014/0226860 A1* | 8/2014 | Hyde | A01M 1/026 |
| | | | 382/103 |
| 2017/0164603 A1* | 6/2017 | Kovarik | A01M 29/16 |
| 2018/0125058 A1* | 5/2018 | Liu | A01M 29/08 |
| 2019/0034736 A1* | 1/2019 | Bisberg | G06K 9/00369 |
| 2019/0078347 A1* | 3/2019 | Gharabegian | E04H 15/02 |
| 2019/0110444 A1* | 4/2019 | Boehm | A01M 29/10 |
| 2019/0141983 A1* | 5/2019 | Morton | F21S 10/06 |
| | | | 250/494.1 |
| 2020/0221685 A1* | 7/2020 | Seetharam | A01M 29/10 |

OTHER PUBLICATIONS

"Face ID 2 FMM User Guide", Oct. 10, 2017, FingerTec, https://www.fingertec.com/customer/download/postsales/HUM-FaceID2_FMM-E.pdf (Year: 2017).*

University of Veterinary Medicine, "Brain training for old dogs: Could touchscreen games be the Sudoku of man's best friend?", Feb. 7, 2018, EurekAlert.org, https://www.eurekalert.org/pub_releases/2018-02/uovm-btf020718.php (Year: 2018).*

Apple, "Use Face ID on your iPhone or iPad Pro", Dec. 23, 2017, apple.com, https://support.apple.com/en-US/HT208109 (Year: 2017).*

* cited by examiner

DYNAMIC AND GEO-FENCED MANIPULATION OF INSECTS WITH DEVICE SCREENS

BACKGROUND

The present invention relates to mobile devices having touch-sensitive screens and, in particular, to a method for protecting the operation of mobile devices from being manipulated by insects landing on the screens.

Mobile devices having touch-sensitive screens are now used everywhere, both indoors and outdoors. Particularly in an outdoor environment, it is possible for the touch-sensitive screen to receive unintentional contact from various objects. For example, a flying insect can land on a specified area of the screen, causing a program of the mobile device to launch or close. This problem is magnified by the fact that insects are attracted to light as well as, for camouflage purposes, to certain colors of light. Therefore, there is a need to operate a mobile device in a manner that prevents accidental or inadvertent commands being received at the mobile device due to insect behavior.

SUMMARY

Embodiments of the present invention are directed to a computer-implemented method of operating a mobile device, including: obtaining a data regarding an animal proximate to a touch screen of the mobile device; determining, from the data, a type of animal; and performing an action at the mobile device based on the type of animal in order to manipulate a behavior of the animal.

Embodiments of the present invention are directed to a mobile device, including: a sensor receivable of data regarding an animal proximate the mobile device; an animal database; and a processor configured to: compare the data to the animal database to determine type of animal at the mobile device; and perform an action on the mobile device based on the type of animal in order to manipulate a behavior of the animal.

A computer program product for operating a mobile device, the computer program product comprising a computer readable storage medium having program instructions embodied therewith, the program instructions executable by a processor to cause the processor to perform a method including: obtaining a data regarding an animal proximate to a touch screen of the mobile device; determining, from the data, a type of animal; and performing an action at the mobile device based on the type of animal in order to manipulate a behavior of the animal.

DETAILED DESCRIPTION

Figure 1:
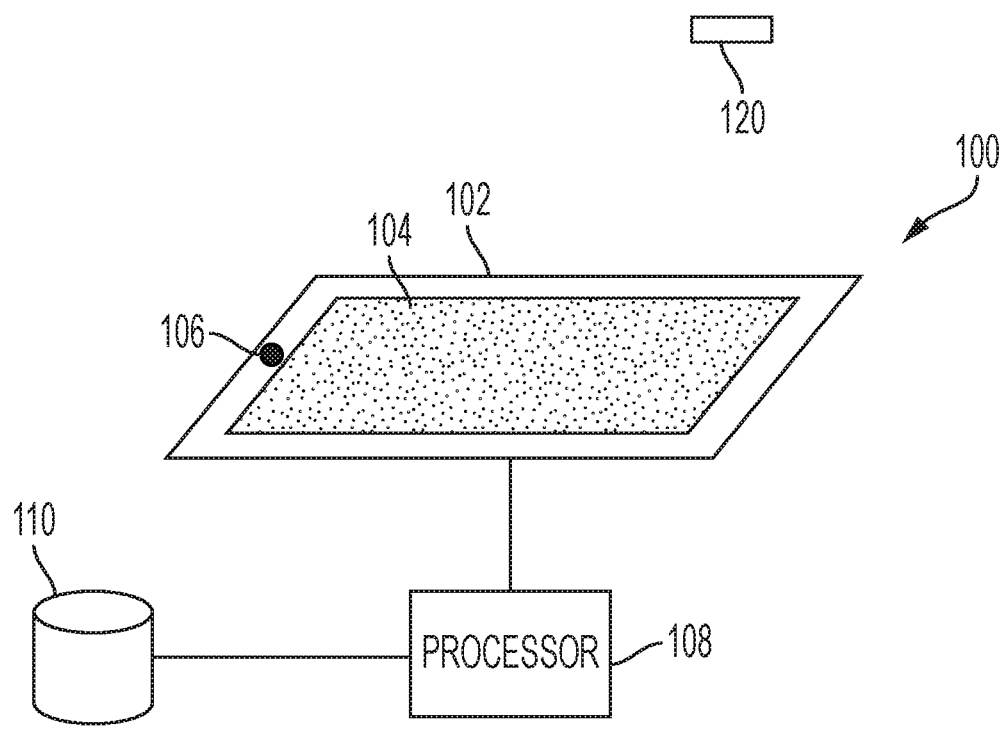
FIG. 1 shows a mobile device suitable for operating in an environment having one or more insects in an embodiment.

FIG. 1 shows a mobile device 100 suitable for operating in an environment having one or more insects in an embodiment. The mobile device 100 includes a body 102, a touch-sensitive screen 104, and a camera 106. The touch-sensitive screen 104 and the camera 106 are sensors of the mobile device 100 and are suitable for capturing, obtaining, receiving or sensing data, such as a touch signature (via the screen 104) or an image (via the camera 106). In various modes of operation, a user of the mobile device 100 operates the mobile device 100 or makes a selection at the mobile device 100 by touching or making contact with the touch-sensitive screen 104 at a selected location of the screen 104. An electrical signal generated by the user's touch or contact at the selected location of the screen 104 sends a command to a processor 108 of the mobile device 100, enabling the processor 108 to perform an action related to the location of the touch or contact, such as by running a program or application at the mobile device 100. The screen 104 includes a plurality of pixels that can be lit up or turned off. The screen 104 can be in an "off" state in which the pixels are turned off. When a user enters a command, such as by touching the screen 104 or pressing a button (not shown) or the mobile device 100, the screen 104 will change from the "off" state to an "on" state in which the pixels are lit up, allowing the user to make various selections. In the "on" state, the screen 104 can show various icons representing different programs or applications of the mobile device 100 in order to guide the user's selection. The user can select an icon by placing his or her finger on the screen at the location of the icon.

Once the user has finished entering a command into the mobile device 100, the screen generally remains lit for a selected "timeout" period before switching back to the "off" state. In various embodiments, the duration of the timeout can be between 15 seconds to 30 seconds, but the timeout period can be any duration of time. If at any time during this timeout period, the user touches the screen again, the clock for initiating the timeout period is reset. Also, some programs that run on the mobile device 100 can keep the screen 104 lit as part of its operation. Therefore, the mobile device 100 can be in a lit stage for various periods of time while not being attended to by the user.

Further shown in FIG. 1 is an intrusive animal 120 or intrusive being that can be attracted to the light at the screen 104 of the mobile device 100. In various embodiments, the intrusive animal 120 is an insect, moth or another flying object. Insects are generally attracted to light and therefore are attracted to land on the screen 104 when the screen is in an "on" state. The touch of the animal 120 can inadvertently cause operation of the mobile device 100 (e.g., starting a program, closing a program, etc.).

FIG. 1 further shows an object database 110 of the mobile device 100. In various embodiments, the object database 110 can be an animal database or an entomological database. The object database 110 is a database of touch signatures for a plurality of animals or insects and/or a database of images of animals or insects. The touch signature for an insect can include, for example, a weight or pressure exerted by the inset, a known "fingerprint" of the insect, a circumference or diameter of the insect, an insect navigation probability, etc. The object database 110 can further include touch signatures for identifying human contact via a finger or a stylus, including a weight or pressure applied by the finger or stylus, a fingerprint, a relative circumference or diameter, etc.

When the animal 120 touches the screen 104 or is imaged by the camera 106, the touch signature of the animal 120 and/or the image of the animal 120 is compared to touch signatures and/or images in the object database 110 in order to identify the type of animal 120 (e.g., grasshopper, moth, gnat). Once identified, the processor 108 runs a behavior manipulation program that manipulates the behavior of the animal 120 in order to prevent the animal 120 from touching the screen 104 in a manner that causes a change in an operating state of the mobile device 100, or to reduce the possibility of the animal 120 touching the screen in such manner.

In various embodiments, the behavior manipulation program can change a color of the screen 104. The color can be selected as a color that repels the identified animal 120. Alternatively, the program may change the color of the screen 104 temporally, either by modulation of the frequency of the color over time or by changing an intensity of the color over time, or both. The rates of color modulation and/or the rate of intensity change can be changed based on an insect density at the touch screen or in order to aggravate a persistent insect or insects. The color modulation can be performed to reduce electrical output as many insects can be impacted by electrical fields.

In another embodiment, a selected region of the screen 104 can be illuminated in order to attract the insect to the selected region. The selected region can be a region of the screen 104 for which no commands can be entered due to touch. The insect can then be confined to the touch-insensitive region. Alternatively, once the insect is attracted to the selected region, the color of the region can be changed or the location of the region can be moved.

The processor 108 can obtain images of the surrounding vicinity and catalog a change in insect population in the vicinity of the screen 104 at a plurality of times. The processor 108 can then determine the response of the insects to the behavior manipulation program. The behavior manipulation program can then be modified based on the response.

In various embodiments, the observation, identification, and manipulation of the insects can be performed as part of a program that is activated when a user selects the program. Alternatively, the program can be run in the background or automatically activated after a selected amount of time into the timeout period such as, for example, 5 seconds.

Figure 2:
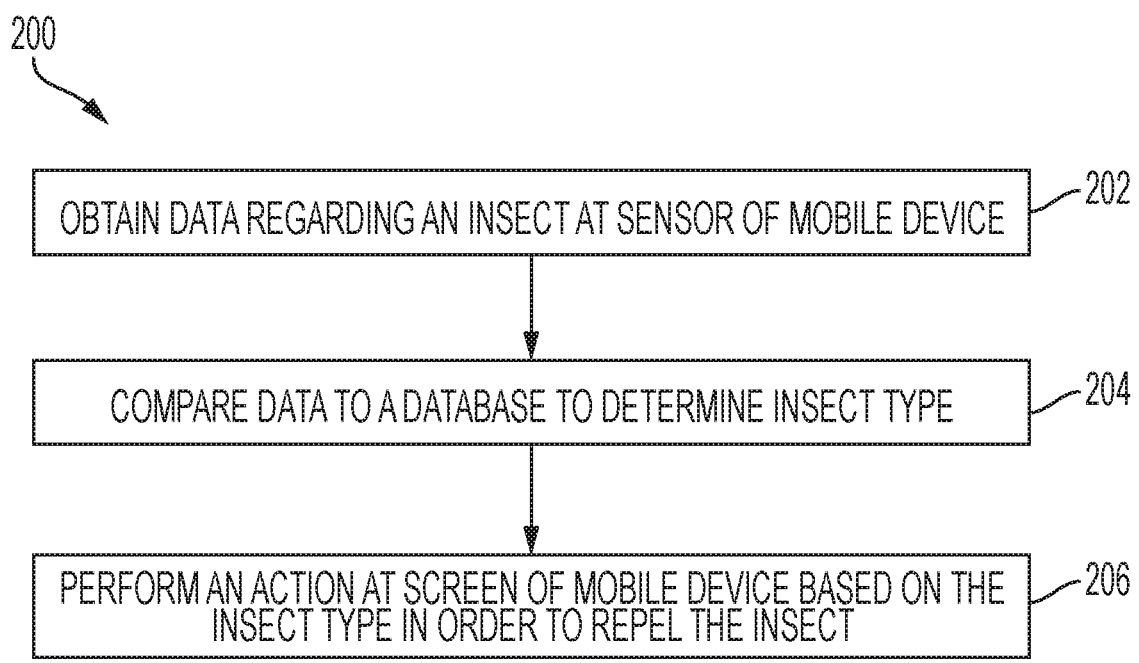
FIG. 2 shows a flowchart illustrating a method for operating the mobile device according to an embodiment.

FIG. 2 shows a flowchart 200 illustrating a method for operating the mobile device 100 according to an embodiment. In box 202, a sensor of the mobile device receives a data as input. In box 204, the data received at the sensor is compared to data in a database in order to identify the type of insect, such as its genus and/or species. In box 206, a program is operated in order to manipulate pixels at the screen 104 of the mobile device to control the behavior of the insect. Controlling the behavior can include repelling the insect from the touch screen 104 or directing the insect to a selected location. The actions performed by the program can be tailored to the type of insect identified in box 202.

Figure 3:
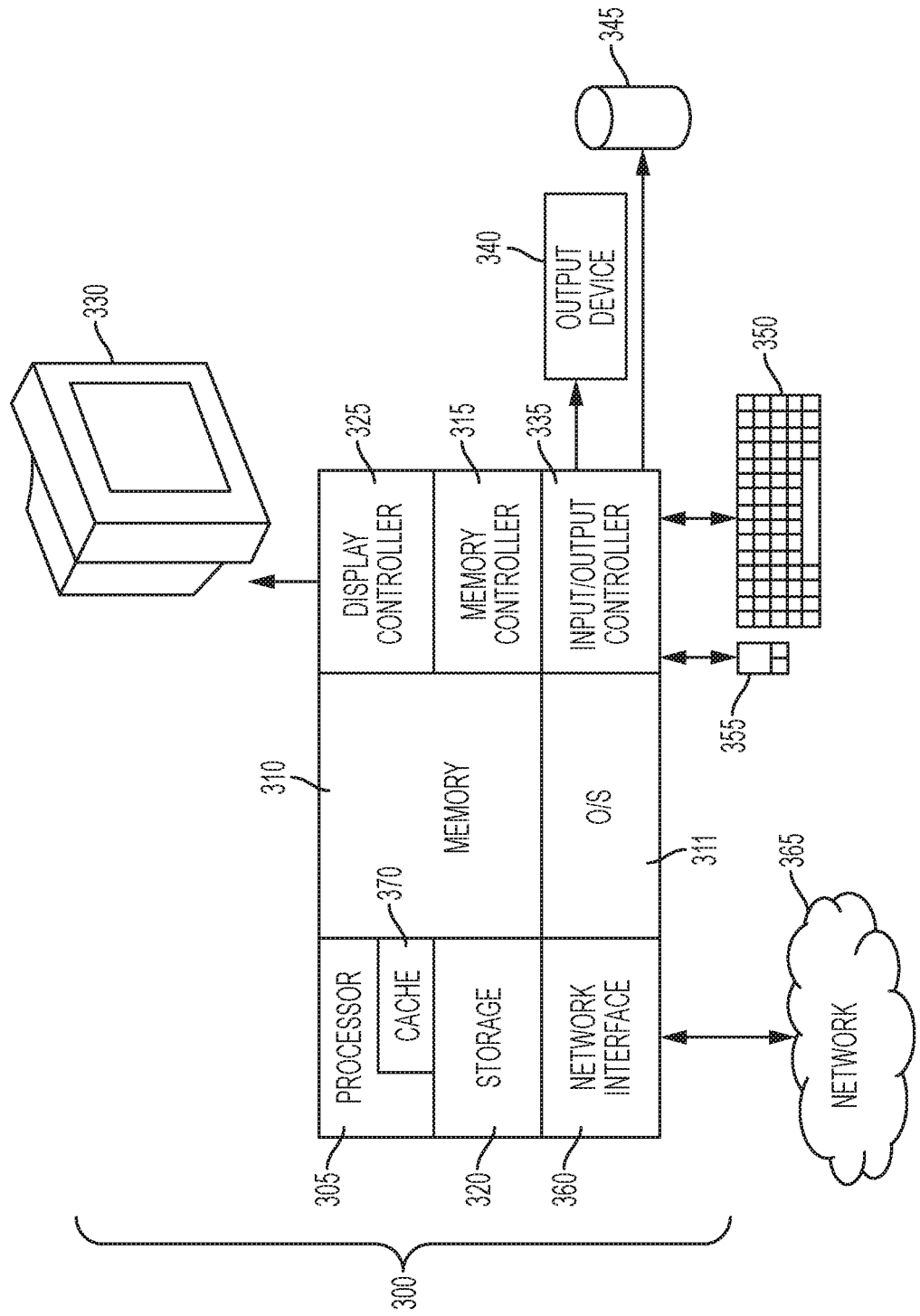
FIG. 3 illustrates a block diagram of a computer system for use in implementing a system or method according to some embodiments.

FIG. 3 illustrates a block diagram of a computer system 300 for use in implementing a system or method according to some embodiments. The systems and methods described herein may be implemented in hardware, software (e.g., firmware), or a combination thereof. In some embodiments, the methods described may be implemented, at least in part, in hardware and may be part of the microprocessor of a special or general-purpose computer system 300, such as a personal computer, workstation, minicomputer, or mainframe computer.

In some embodiments, as shown in FIG. 3, the computer system 300 includes a processor 305, memory 310 coupled to a memory controller 315, and one or more input devices 345 and/or output devices 340, such as peripherals, that are communicatively coupled via a local I/O controller 335. These devices 340 and 345 may include, for example, a printer, a scanner, a microphone, and the like. Input devices such as a conventional keyboard 350 and mouse 355 may be coupled to the I/O controller 335. The I/O controller 335 may be, for example, one or more buses or other wired or wireless connections, as are known in the art. The I/O controller 335 may have additional elements, which are omitted for simplicity, such as controllers, buffers (caches), drivers, repeaters, and receivers, to enable communications.

The I/O devices 340, 345 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 305 is a hardware device for executing hardware instructions or software, particularly those stored in memory 310. The processor 305 may be a custom made or commercially available processor, a central processing unit (CPU), an auxiliary processor among several processors associated with the computer system 300, a semiconductor based microprocessor (in the form of a microchip or chip set), a macroprocessor, or other device for executing instructions. The processor 305 includes a cache 370, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 370 may be organized as a hierarchy of more cache levels (L1, L2, etc.).

The memory 310 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 310 may incorporate electronic, magnetic, optical, or other types of storage media. Note that the memory 310 may have a distributed architecture, where various components are situated remote from one another but may be accessed by the processor 305.

The instructions in memory 310 may include one or more separate programs, each of which comprises an ordered listing of executable instructions for implementing logical functions. In the example of FIG. 3, the instructions in the memory 310 include a suitable operating system (OS) 311. The operating system 311 essentially may control the execution of other computer programs and provides scheduling, input-output control, file and data management, memory management, and communication control and related services.

Additional data, including, for example, instructions for the processor 305 or other retrievable information, may be stored in storage 320, which may be a storage device such as a hard disk drive or solid state drive. The stored instructions in memory 310 or in storage 320 may include those enabling the processor to execute one or more aspects of the systems and methods of this disclosure.

The computer system 300 may further include a display controller 325 coupled to a display 330. In some embodiments, the computer system 300 may further include a network interface 360 for coupling to a network 365. The network 365 may be an IP-based network for communication between the computer system 300 and an external server, client and the like via a broadband connection. The network 365 transmits and receives data between the computer system 300 and external systems. In some embodiments, the network 365 may be a managed IP network administered by a service provider. The network 365 may be implemented in a wireless fashion, e.g., using wireless protocols and technologies, such as WiFi, WiMax, etc. The network 365 may also be a packet-switched network such as a local area network, wide area network, metropolitan area network, the Internet, or other similar type of network environment. The network 365 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods according to this disclosure may be embodied, in whole or in part, in computer program products or in computer systems 300, such as that illustrated in FIG. 3.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for operating a mobile device, the computer program product comprising a computer readable storage medium having program instructions embodied therewith, the program instructions executable by a processor to cause the processor to perform a method comprising:
    obtaining a data regarding an insect proximate to a touch screen of the mobile device;
    determining, from the data, a type of insect; and
    performing an action at the mobile device based on the type of insect in order to manipulate a behavior of the insect,
    wherein the action comprises displaying light of a selected color on the touch screen to attract the insect and moving a region at which the selected color is displayed to a different location of the touch screen to encourage the insect to move to the different location of the touch screen.

2. The computer program product of claim 1, wherein obtaining the data further comprises obtaining at least one of (i) a touch signature of the insect at the touch screen; and (ii) an image of the insect at a camera of the mobile device.

3. The computer program product of claim 2, further comprising comparing the obtained data to an insect database of the mobile device in order to identify the type of insect.

4. The computer program product of claim 1, further comprising obtaining the data, determining the type of insect and performing the action as part of one of: (i) a program initiated by a user of the mobile device; (ii) a program that activates at a selected time during a timeout period of the mobile device.

5. A mobile device, comprising:
    a sensor receivable of data regarding an insect proximate the mobile device;
    an animal database; and
    a processor configured to:
        compare the data to the insect database to determine type of animal at the mobile device; and
        perform an action on the mobile device based on the type of insect in order to manipulate a behavior of the insect,
        wherein the action comprises displaying light of a selected color on the touch screen to attract the insect and moving a region at which the selected color is displayed to a different location of the touch screen to encourage the insect to move to the different location of the touch screen.

6. The mobile device of claim 5, wherein the sensor includes at least one of (i) a touch-sensitive screen responsive to a touch of the insect; and (ii) a camera for capturing an image of the insect.

7. The mobile device of claim 6, wherein the processor is configured to identify the insect by at least one of: (i) comparing a touch signature of the insect at the touch-sensitive screen to a touch signature stored in the insect database; and (ii) comparing a captured image of the insect to an image stored in the insect database.

8. The mobile device of claim 5, wherein the processor is further configured to manipulate the behavior of the insect by controlling an electrical field produced by the mobile device.

9. The mobile device of claim 5, wherein the processor determines the type of insect and performs the action as one of: (i) a program initiated by a user of the mobile device; (ii) a program that activates at a selected time during a timeout period of the mobile device.

10. A computer-implemented method of operating a mobile device, comprising:
    obtaining a data regarding an insect proximate to a touch screen of the mobile device;
    determining, from the data, a type of insect; and
    performing an action at the mobile device based on the type of insect in order to manipulate a behavior of the insect,
    wherein the action comprises displaying light of a selected color on the touch screen to attract the insect and moving a region at which the selected color is displayed to a different location of the touch screen to encourage the insect to move to the different location of the touch screen.

11. The computer-implemented method of claim 10, wherein obtaining the data further comprises obtaining at least one of (i) a touch signature of the insect at the touch screen; and (ii) an image of the insect at a camera of the mobile device.

12. The computer-implemented method of claim 11, further comprising comparing the obtained data to an insect database of the mobile device in order to identify the type of insect.

13. The computer-implemented method of claim 10, wherein manipulating the behavior of the insect further comprises controlling an electrical field produced by the mobile device.

14. The computer-implemented method of claim 10, further comprising obtaining the data, determining the type of insect and performing the action as part of one of: (i) a program initiated by a user of the mobile device; (ii) a program that activates at a selected time during a timeout period of the mobile device.

\* \* \* \* \*